Nov. 14, 1961 SAICHIRO OHASHI 3,008,394
INTERENGAGING MECHANISM BETWEEN EXPOSURE METER AND
CAMERA DIAPHRAGM AND SHUTTER SPEED CONTROLS
Filed May 28, 1957 2 Sheets-Sheet 1
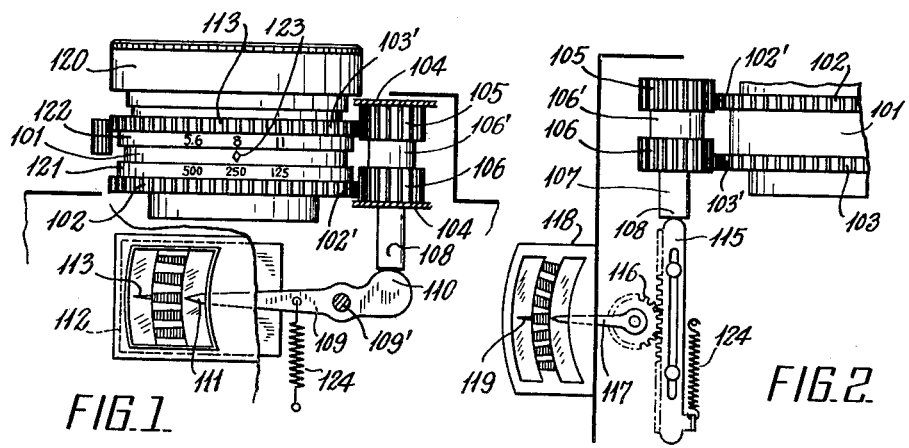
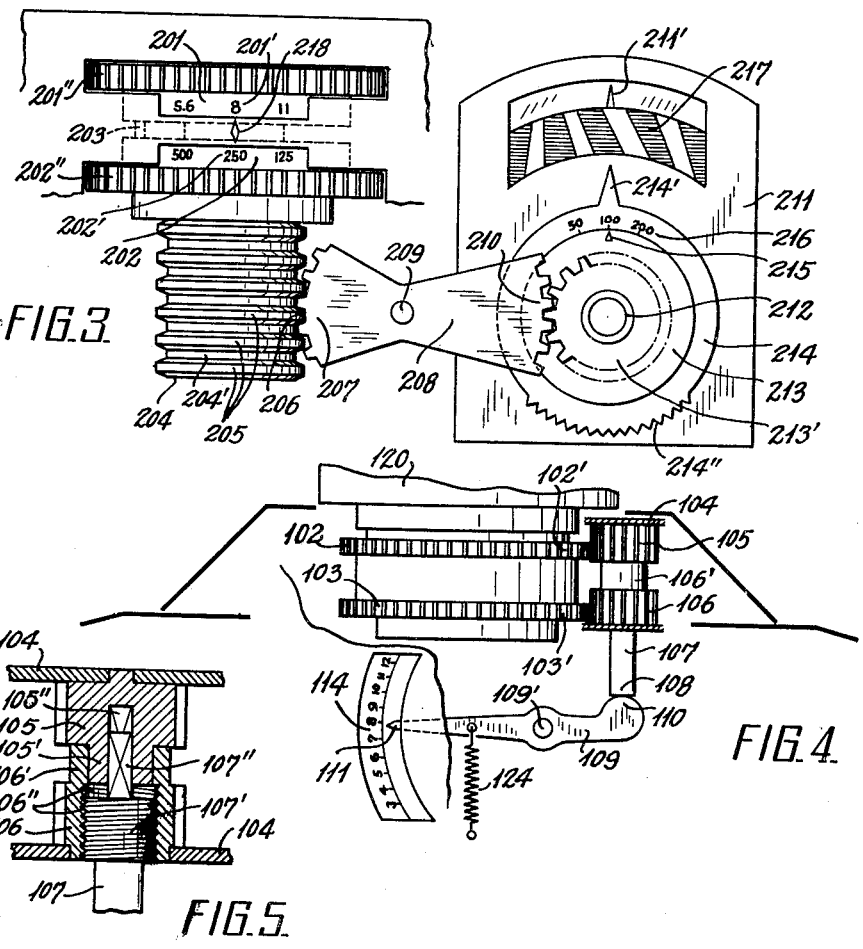

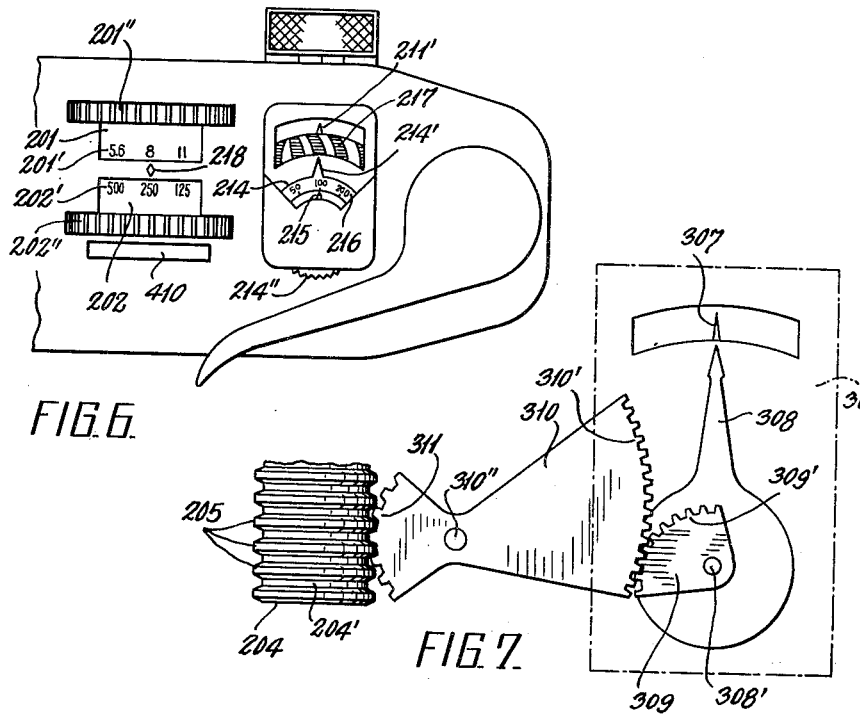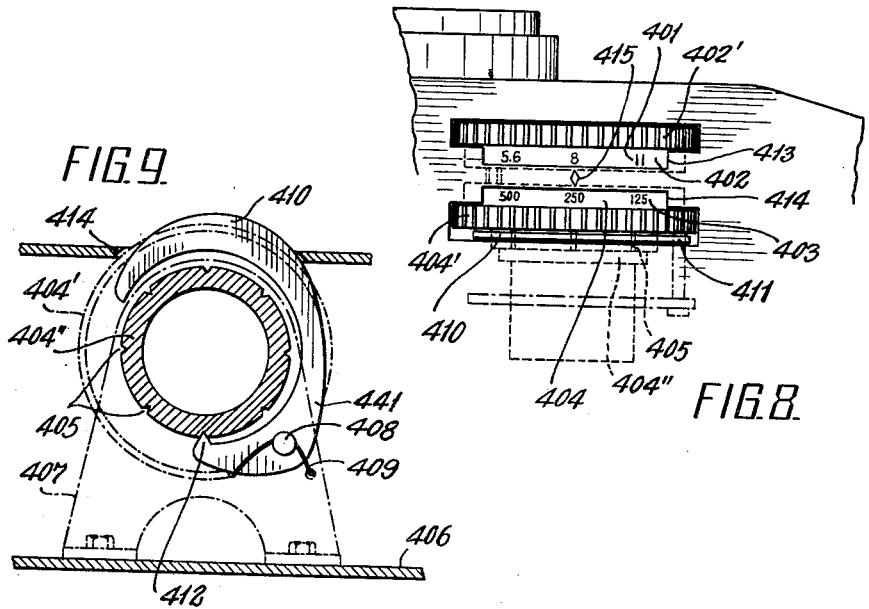

3,008,394
INTERENGAGING MECHANISM BETWEEN EXPOSURE METER AND CAMERA DIAPHRAGM AND SHUTTER SPEED CONTROLS
Saichiro Ohashi, Kita-ku, Kyoto City, Japan, assignor to Chiyoda Kogaku Seiko Kabushiki Kaisha, Osaka City, Japan, a corporation of Japan
Filed May 28, 1957, Ser. No. 662,107
4 Claims. (Cl. 95—10)

The present invention relates to an interengaging mechanism of the moving contact type between an adjusting mechanism for varying shutter speeds and diaphragm values, and an exposure meter for use in a photographic camera.

In the usual photographic camera, such interengaging mechanism requires a large space in or on the camera which presents difficulties in the manufacture as well as the manipulation of such a camera, because a complicated combination of cams, gear wheels and the like is inevitably necessary to provide for setting and operating the required dials.

The present invention overcomes the above-mentioned difficulties by providing respective interengaging members which are operable alone or in combination with respective actuating members for varying shutter speeds and diaphragm apertures. These operating members are arranged in conjunction with shutter speed and diaphragm aperture indicating members, and the interengaging members are provided with an adjusting member in common which is operable only when either of the interengaging members makes a forward or backward movement, said adjusting member being operatively connected with an indicator needle coacting with a light intensity graduation.

Thus, according to the present invention, an appropriate condition of exposure can readily be achieved by performing a perfect interengaging freely and simply in compliance with a diaphragm aperture and a shutter speed which have been manifested on the front face of a camera, insofar as that the lens shutter maintains the theoretical multiple system mechanism of the equal-spaced speed and iris aperture, in order to determine the shutter speed as well as iris aperture by way of a combination exposure meter according to this invention. Moreover, necessary operations can be effected exactly simply by means of actuating members performing selectively an axial forward and backward movement, with complete abolition of a complicated mechanism, such as cams, gear wheels, etc., and with a result, no intricate modifications are needed; for instance, a speed and diaphragm controlling means disposed outside of the camera; variable mechanism for the shutter speed and diaphragm aperture which have been provided usually outside of the camera being required to be arranged inside the camera body and the provision of intermediate or follower members being necessary.

In the following, the mechanism according to the present invention is described in more detail in reference to the accompanying drawings, of which FIG. 1 is a plan view of a first embodiment of the mechanism according to the present invention with a part thereof removed.

FIG. 2 is a broken plan view of a second embodiment similar to FIG. 1 with a part thereof removed.

FIG. 3 is a plan view of a third embodiment similar to FIG. 1 with a part thereof removed.

FIG. 4 is a broken plan view of an embodiment, wherein the needle of an exposure meter is not directly actuated.

FIG. 5 is a sectional side view of an adjusting member of this invention.

FIG. 6 is a plan view of an embodiment of a camera, wherein an exposure meter is provided within the camera interengaging with a shutter speed and diaphragm aperture in moving contact therewith, with a part thereof broken away.

FIG. 7 is a plan view of an embodiment of a type wherein the usual light value scale is not necessary for the follower member, with a part thereof being removed.

FIG. 8 is a plan view of interengaging dials in the camera wherein the diaphragm aperture and shutter speed dials are interengaged, with a part thereof broken away.

FIG. 9 is a side view of the principal parts illustrated in FIG. 8.

Referring to FIG. 1 in which the first embodiment of this invention is illustrated, a lens shutter member 101 is held by the main camera body and formed in an incorporated relation to a lens-cylinder 120 of well known construction. There are also provided a shutter speed controlling mechanism 102, and a diaphragm controlling member 103, adapted to coact with a variable shutter mechanism and a variable diaphragm orifice mechanism respectively, which extend out of said member 101 and are enclosed in said member, respectively. The said members 102, 103 are well-known, annular bodies, on the outer peripheral surfaces of which gear teeth 102', 103' are provided for interengagement with elements later to be described. A diaphragm interengaging body 105 and a shutter speed interengaging body 106, in the form of gear wheels, are rotatably disposed in a position adjacent to both members 102, 103 by means of a supporter 104 which is a part of the camera body. The teeth of the gear wheels 105 and 106 mesh the teeth 102' and 103' on the members 102 and 103, respectively. As for said interengaging bodies 105, 106, the journal 105' of the interengaging body 105 is loosely inserted into the tubular axial portion 106' of the interlocking body 106. See FIG. 5. An adjusting member 107 for adjusting the position of an indicating member is carried by both of said interengaging bodies 105 and 106 coaxially therewith. The lower inner portion of the body 106 is an internally threaded screw cylinder 106'' and the lower internal portion of the body 105 is an axially positioned rectangular socket 105''; and a head portion of the adjusting member has an externally threaded portion 107' for engagement with the internal threads of the screw cylinder 106'' and a rectangular jack portion 107''' for sliding engagement with the rectangular socket 105''. Thus the adjusting member 107 rotates with the bodies 105 and 106 when these bodies rotate together. However, when the interengaging bodies 105 and 106 rotate with respect to each other, the screw cylinder 106'' moves the adjusting member 107 axially while the jack portion 107''' turns with the interengaging body 105 while moving axially in the rectangular socket 105''. Obviously the screw cylinder might be formed in the member 105 and the rectangular socket might be formed in the member 106. The outer end 108 of the adjusting member 107 is in contact with an end 110 of an indicating member 109, pivotally mounted as at 109' upon the camera body, which is capable of making free pivotal movement; the head portion 111 of said member 109 may be brought into register with a pointer 113 of the ammeter portion of an exposure meter 112 telescopically provided in the camera body. Between the pointer 113 and the head portion 111 a scale is provided, said scale being dispensed with when a construction can be provided for registry with the member 109 which is capable of movement similar to that of the pointer 113.

Furthermore, the shutter member 101 of the invention has a shutter speed dial and a diaphragm orifice dial thereon having equal division speed and diaphragm orifice graduations, respectively. The graduations of each scale are arranged for registry with those of the other, and therefore the respective numerals are necessarily engraved in mutually reverse on the two scales. The speed indicating body 121 and the diaphragm orifice indicating body 122 are arranged respectively to cooperate with said speed controlling member 102 as well as said diaphragm controlling member 103. In other words, as shown in FIG. 1, a setting mark 123 is provided between both members, and further both controlling members 102, 103 are operated as follows: when the one member 102 is rotated, for instance, by a disengaging member such as a clip-stop, the other member 103 follows this rotation. It is necessary in this case to stop either of those members 102 and 103 while the other is selectively rotated, if necessary. All such mechanisms are well-known, and the details need not be dealt with herein. The controlling members 102, 103 may be rotated directly or by means of a knob.

FIG. 2 represents a second embodiment of this invention as applied to a binocular reflex camera. In this instance, the adjusting member 107 is illustrated as operating a toothed indicating member 117 through a rack member 115, loaded through a tension spring 124, and coacting with gear teeth 116 on the indicating member 117. The indicating member is pivoted to register with the indicating needle 119 of an exposure meter 118 which is disposed, for instance, upon a side wall of the binocular reflex camera body. All of these disclosures are embodiments in which the present invention is to be embodied in a casing of limited size according to the type of camera. Of course, various modifications of such designs may be made easily.

The manner in which the above-mentioned 1st and 2nd embodiments of the invention are operated will now be explained.

The mechanism according to the present invention is constructed in such a manner that operational members 102, 103 on the shutter 101 are arranged directly to be in engagement with the other interengaging members 105 and 106 respectively through the gear teeth 102' and 103' thereon. Therefore, in case the operational member 102 is revolved, respective indicating bodies 121 and 122 for shutter speeds and diaphragm values are interlocked in one body, since said operational member 102 and the diaphragm controlling member 103 are interlocked by click connection. In this case, the two interengaging members 105, 106, in mesh with each operational member 102, 103, are revolved as one body. Therefore, the adjusting member 107 encased therein (FIG. 5) is not moved axially; and the indicating member 109, coming in contact with the outer end 108 of the adjusting member 107 is not revolved. This arrangement will be described concretely with respect to FIG. 1 as in the following: In case a shutter speed 1/250 sec. and a diaphragm orifice value f8 are adjusted at the stationary setting mark 123, and then the shutter speed is lowered to 1/125 sec. by revolving the speed operational member 102, the diaphragm part being interlocked with the shutter speed part rotates with the shutter speed part to the position 125 of the setting mark. (In this case, there occur no marked change in the light intensity.) Under such conditions, if needle 113 of the exposure meter 112 in FIG. 1 is in alignment with indicating member 109, the exposure shown will be appropriate, and if the member 109 does not register with the needle 113, the exposure will not be adequate. In the latter case, the shutter speed and diaphragm aperture have to be corrected. In this case, when the shutter speed is to be changed, the shutter speed-operational member 102 is revolved alone with the diaphragm operational member 103 kept inoperative. Then, as the interengaging member 106 revolves and the diaphragm operational member 103 does not revolve, the upper interengaging member 105 will not move. However, the adjusting member 107 can not move as it is engaged with said fixed interengaging member 105 through the head portion 107" with a result, while the member 107 can be moved axially by rotating the screw rod portion 106" of the interengaging member 106 against the screw rod portion 107'. Accordingly, the entering and retreating of outer end 108 actuates the end 110 of the indicating member 109 to move the aforementioned member 109 pivotally. The head portion 111 will shift in one direction, until said portion 111 comes to coincide with the needle 113 indicating an adequate shutter speed value at this instance under a fixed diaphragm orifice value. On the other hand, an adequate diaphragm orifice value under a fixed shutter speed is indicated similarly by rotating only the diaphragm operational part with the shutter speed part kept stationary. Thereafter, either of the members 102 and 103 on one side is not stopped, but both members 102 and 103 are set to revolve in one body, and then either the member 102 or 103 is caused to revolve. Then, the adjusting member 107 will not move forwards nor backwards and a desired combination of shutter speed and diaphragm value can be chosen.

In FIG. 4 is illustrated an embodiment wherein a separate exposure meter is employed and wherein a scale of light intensity indices is affixed to the camera. In this case, a graduated scale 114 of light value intensity indices is engraved or otherwise applied on top of the camera body, and the indicating member 109 is arranged to point at each respective light intensity index of said graduation 114 with its pointer 111. Thus, the member 109 can be made to coincide with the same light index of the light intensity graduation 114 on the camera body as that designated by the needle of the separate exposure meter.

In FIG. 3 is shown a third embodiment of the present invention, wherein a variable dial for shutter speeds and diaphragm orifice-values is provided at a position separate from the shutter speed and diaphragm orifice controlling value mechanism. In this embodiment, the adjusting member 204 is formed with outer peripheral portions 204' in relief around the dial body of said member 204'. On said peripheral portions 204', there are formed numbers of parallel annular rack portions 206 having numerous circumferential straps 205. An interengaging lever 208 is pivoted as at 209 on the camera in suitable position, said interengaging lever 208 being provided at one end with a toothed sector 207 in mesh with said straps 205, said interengaging lever 208 also being formed at its other end as a toothed sector 210. The toothed sector 210 is arranged to be in mesh with a gear wheel 213' of a member 213, mounted rotatably on a spindle 212 of an exposure meter 211 which in turn is accommodated in the camera body by utilizing, for instance, the camera casing. At the same time, as in the case of said rotary body 213, a follower member 214 is mounted on said spindle 212, said member 214 having a rounded portion 214" for revolving alone or together with said rotary member through a friction joint portion. Further on the rotary member 213 a setting mark 215 is provided, and on the follower member 214 are provided a needle portion 214' as well as graduation 216 for light sensitivity of film to be set at said setting mark 215. The needle portion 214' is arranged for registration with the needle 211' of the exposure meter. And another setting mark 218 is provided on the camera body intermediate between the aforementioned diaphragm orifice and shutter speed dials 201 and 202.

Now, the manner in which the third embodiment is operated may be described as follows:

The adjusting member 204 (corresponding to the adjusting member 107 in the case of the first and second embodiments) does not move to and fro, when the diaphragm orifice and shutter speed dials 201, 202 revolve together. It moves forward and backward axially only when the diaphragm orifice and shutter speed dials move separately. The adjusting member 204 revolves to no purpose, though it revolves, while said member 204 does not make axial movement forward or backward.

As a result, the sector-gear 207 of the interengaging member 208, meshing with the annular parallel straps 205 on the outer peripheral body 204', does not revolve said interengaging member but remains at rest. When the dial members 201 or 202 rotate individually, the adjusting member 204 moves axially forewards and backwards and the rack portion 206 acts as a rack to revolve the toothed sector 207, and the interengaging member 208 revolves about the pivot or fulcrum 209. On the other hand, the toothed sector 210 revolves the gear wheel 213' of the rotary member 213. Then a follower member 214 revolves, since it is constructed to revolve unitarily with the gear, and the revolution of the follower member 214 then sets the displacement of the needle portion 214'. The exposure meter 211 is adjusted for use with any particular film sensitivity by rotating the follower member 214 individually with respect to the gear wheel 213 to cause the setting mark 215 of rotary member 213 to register with the appropriate light sensitivity graduation 216 on the follower member 214. This is effected by using the roweled portion 214" to turn the follower member. Then, the starting position of needle 214' of member 214 revolving unitarily with rotary member 213 is set according to each different sort of film for conducting the adjustment. Thus, the displacement of adjusting member 204 can be perfectly transmitted as a displacement of rotary member 213 to facilitate a precise adjusting movement, for the reason that the adjusting member 204 transmitting adjusted movement and the interlocking member 208 are given the aforementioned construction. Further, the diaphragm orifice and shutter speed dials 201 and 202 are respectively connected to the adjusting mechanism for the diaphragm orifice and shutter speed through gearing, in known manner which is not illustrated.

In the next place, FIG. 6 represents an embodiment wherein the mechanism of the third embodiment as shown in FIG. 3 is designed to be assembled within the camera.

This is illustrative only, the adjusting member 204, the interlocking member 208, and the rotary member 213 being behind the camera face. A portion of the roweling 214" on the member 214 is visible in this figure, however. FIG. 7 illustrates an embodiment intended to eliminate the type of light value scale which is needed because of the uniformity occurring generally in the movement of an ammeter needle to indicate light values, and the respective mechanisms for shutter speed and diaphragm orifice values as shown in the aforementioned 1st to 3rd embodiments. See the scale 217 illustrated in FIGS. 3 and 6. In the present case, between the exposure meter casing 302 and the adjusting member 204 of FIG. 3, the follower member 308 is mounted rotatably on the shaft 308' in the vicinity of the ammeter needle 307 of exposure meter casing 302 as illustrated in FIG. 7, and a driving member 309 in the form of a toothed sector is provided coaxially therewith having an engaging surface 309' which is a logarithmic helical curve. Further, a transmission member or lever 310 is carried by a pivot 310", and has a toothed logarithmic curved face 310' in engagement with the teeth on the sector 309, whereby the lever 310 and the toothed sector 309 turn together about their respective pivots. The lever 310 has, on its end opposite to that having the toothed face 310', a toothed sector 311 which is adapted to engage the straps 205 on the adjusting member 204. In this case, the adjustment according to the light sensitivity may be accomplished by changing the starting position of the aforementioned transmission member 310. Thus, the member 308 or the member 309 may be loosely mounted on the shaft 308', and the members may be frictionally engaged with each other. Adjustment is then effected as already explained in connection with FIG. 3.

FIGS. 8 and 9 represent an engaging and disengaging device of the diaphragm aperture and shutter speed dials in the cameras of the first to third embodiments. Properly spaced engaging notches 405 are provided on the outer peripheral relief portion of the member 404" affixed to either of the dials (the shutter speed dial 404 selectively provided is illustrated in the drawing). On a holder 407 secured to a part inside of the camera body, is provided an engaging lever 411 having a generally semi-circular actuating arm portion 410, a part of which 441 is pivoted to a spindle 408, and which is biased by a spring 409. The engaging head portion 412 of said lever 411 is engaged with an engaging notch portion 405 of said accompanying body 404" and simultaneoulsy, a portion of the actuating arm 410 protrudes through a window 414 in the dial member 404 parallel to the actuating body 410'. Further, in the drawing, the window 414 is illustrated as formed on the side of the shutter speed dial 404. If this mechanism is provided on the side of the diaphragm aperture dial 402, it will be seen that it will protrude parallel to the apparatus already described through the window 414 on the side of the diaphragm orifice dial.

For the purpose of revolving the respective dials 402 and 404, in combination or selectively, each dial has equally spaced shutter speed or diaphragm orifice graduations engraved thereon, and is interlockingly related to the necessary interior mechanism. When the actuating body 402' of the diaphragm aperture body 402 is operated by the finger, the shutter speed dial body 404 connected frictionally or through click joint to the diaphragm orifice body 404, will not move with that body, since the actuating arm member 410 is engaged with engaging notch 405 of its own accompanying body 404" at the head portion 412 of member 10 opposite to said notch 405. Thus, only the diaphragm orifice dial member 402 moves against the click joint. In FIG. 8, the iris f8 and shutter speed 1/250 sec. are shown at the setting mark 415. Now when the dial body 402 is turned to the right as viewed in the drawing, the diaphragm aperture alone is shifted to f5.6, and when it is turned to the left, then the diaphragm aperture is shifted to f11. If it is intended to move both dial bodies 402 and 404 together, then a start may be made with the diaphragm set at f8 and the shutter speed at 1/250 sec. at the setting mark 415 as shown in FIG. 8. If it is intended to shift to, for instance, a combination of the diaphragm f5.6 and the shutter speed 1/500 sec., the actuating arm 410 of said engaging lever is pushed downwards on the side of the dial body 404 where the engaging lever 411 is provided. Thus pushed down engaging lever 411 is turned around the spindle 408 as a pivot, the head portion 412 is then disengaged from the notch portion 405 of the accompanying body 404", the dial body 404 arranged parallel to the dial 402 revolved by pushing the actuating member 404" thereof continuously in the proper direction with the finger having pushed on the arm member 410. Then, the other diaphragm dial body 402 is also turned round by friction or click joint in one body interlockingly. Then, when the shutter speed dial body 404 is turned to the right the aforesaid combination of diaphragm f5.6 and speed 1/500 sec. will come up at the position of setting mark 415.

Thus, a desirable combination of diaphragm and shutter speed can be obtained under predetermined conditions of exposure. When the above engaging lever 411 is provided on the side of diaphragm dial body 402, generally only the speed dial body 404 revolves, and either of the dials revolves alone independently when the iris dial body 402 is turned around.

By aid of the construction of mechanism as referred to in the foregoing specification, the present invention can facilitate the setting of the conditions of exposure by interengaging the variable mechanism for shutter speeds and diaphragm orifice values having shutter speed and diaphragm orifice value mechanisms of equally spaced multiple system with an exposure meter in a perfect moving contact manner. These mechanisms may be enclosed within a minimum space, can be easily manipulated, can effect an accurate interengagement in a moving contact without necessitating any complicated mechanism, and can promote in marked degree the ease and simplicity of design and fabrication of cameras of the class described.

I claim:

1. Interengaging mechanism for a camera comprising a shutter speed controlling mechanism, a diaphragm orifice controlling mechanism, an interengaging body engaging said shutter speed controlling mechanism and movable therewith, a second interengaging body engaging said diaphragm orifice controlling mechanism and movable therewith, said bodies being coaxially related for rotation together or separately, and an adjusting member for adjusting the position of an indicating member cooperable with a light meter, said adjusting member being carried by both of said interengaging bodies coaxially therewith in threaded engagement with one of said bodies and in axially slidable rectangular jack-and-socket engagement with the other body, whereby said adjusting member rotates with said bodies when they rotate together and is displaced axially with respect thereto only when said bodies rotate with respect to each other.

2. Interengaging mechanism according to claim 1, wherein interengagement between the respective interengaging bodies and the shutter speed controlling mechanism and the diaphragm orifice controlling mechanism is effected by external gears on the respective elements.

3. Interengagement mechanism according to claim 1 wherein one of said bodies is journaled within the other and has a rectangular axial socket therein, the other of said bodies has an internally threaded axial tubular section thereof, and said adjusting member has thereon a rectangular head portion slidable in the rectangular socket of said one body and a screw rod portion in threaded engagement with the threads in the internally threaded axial tubular section of said other body, to effect said axial movement of said adjusting member.

4. An interengaging mechanism for a camera and an indicating member for registration with an exposure meter, said mechanism comprising a shutter speed controlling mechanism, a diaphragm orifice controlling mechanism, an interengaging body engaging said shutter speed controlling mechanism and movable therewith, and a second interengaging body engaging said diaphragm orifice controlling mechanism and movable therewith, said bodies being coaxially related for rotation together or separately, in combination with an adjusting member carried by both of said interengaging bodies in threaded engagement with one of said bodies and in axially slidable rectangular jack-and-socket engagement with the other body and movable axially thereof when but one of said bodies is rotated, a light meter, and an indicating member positioned to register with the scale and the needle of said light meter, and positioned for contact with said adjusting member and operable thereby.

References Cited in the file of this patent

UNITED STATES PATENTS

| | | |
|---|---|---|
| 2,305,294 | Kuppenbender | Dec. 15, 1942 |
| 2,467,946 | Rossmann | Apr. 19, 1949 |

FOREIGN PATENTS

| | | |
|---|---|---|
| 756,282 | Germany | Feb. 23, 1953 |
| 876,200 | Germany | May 11, 1953 |
| 179,192 | Austria | July 26, 1954 |
| 184,058 | Austria | Dec. 10, 1955 |
| 762,024 | Great Britain | Nov. 21, 1956 |

OTHER REFERENCES

Kodak, German application Serial No. K22850, printed December 13, 1956.